United States Patent [19]
McLean

[11] 3,910,102
[45] Oct. 7, 1975

[54] LIQUID VOLUMETRIC LINE LEAK TESTING APPARATUS AND METHOD

[76] Inventor: F. Ronald McLean, Apt. 1600, 333 N. Ocean Blvd., Deerfield Beach, Fla. 33441

[22] Filed: May 17, 1974

[21] Appl. No.: 470,852

[52] U.S. Cl. .............................. 73/40.5 R; 73/49.2
[51] Int. Cl.² ........................................ G01M 3/26
[58] Field of Search .............. 73/49.1, 49.6, 40.5 R, 73/49.3, 49.2, 45.4

[56] References Cited
UNITED STATES PATENTS

| | | | |
|---|---|---|---|
| 3,273,753 | 9/1966 | Johnson et al. ................... | 73/40.5 R |
| 3,355,932 | 12/1967 | Mulligan .............................. | 73/49.3 |
| 3,377,844 | 4/1968 | Gandolfo ............................. | 73/49.2 |
| 3,580,055 | 5/1971 | White ................................... | 73/49.2 |

*Primary Examiner*—Harry N. Haroian
*Attorney, Agent, or Firm*—Oltman and Flynn

[57] ABSTRACT

Apparatus and method to determine and certify the tightness, or detect, measure the rate of and locate a leak, in underground lines extending from an underground storage tank at an automotive service station to an above-ground fuel dispensing apparatus. The outlet of a small, portable liquid pump is coupled to an available opening in or under the service station island pump or dispenser, which opening is in unobstructed communication with the lines leading from the tank, so that fluid may be discharged into the dispenser and line to maintain a test pressure therein. A pressure gauge senses the line pressure, and a calibrated burette which supplies make up gasoline to the pump inlet provides means of precise volume measurement whenever the pump is operated to restore the pressure in the line as a consequence of leakage or other cause.

23 Claims, 8 Drawing Figures

LIQUID VOLUMETRIC LINE LEAK TESTING APPARATUS AND METHOD

FIELD OF THE INVENTION

The apparatus and methods of this invention were primarily developed to improve the accuracy, reliability, safety, convenience, and saving of time and labor in testing of underground lines between service station underground gasoline storage tanks and the pumps or dispensers located on the service station "islands." The invention is described herein in relation to such testing. The apparatus and method disclosed herein are, however, suitable for testing the tightness of underground or other lines for any flammable liquid, chemical or other fluid whether or not stored in underground tanks and dispensed or used through similar or other apparatus.

BACKGROUND OF THE INVENTION

The problem of accurate, reliable and efficient means of detecting leakage from underground tanks and lines has become increasingly significant. Tanks underground are becoming older, volumes stored are increasing, and larger tanks, albeit of improved construction, are being installed. Leakage, at one time mainly the concern of fire departments, has also become a problem for telephone and electric utilities now sharing the underground with water, sewer and gas services and underground tank systems. Ecology has become a prime consideration where potable or surface waters are or may become involved. The loss by leakage of scarce or expensive energy fuels should not be tolerated.

Former methods of doubtful reliability and safety for testing tanks and lines with air pressure and methods for detecting gross leaks with a standpipe are presently being displaced with more accurate and reliable methods, as exemplified by the Kent-Moore system disclosed in U.S. Pat. No. 3,580,055, which simultaneously prove the tightness, or measure the leakage rate, in tank systems, including some lines. National Fire Protection Association Publication No. 329, "Underground Leakage of Flammable & Combustible Liquids 1972," includes the following provisions:

"Chapter IV. Testing For Underground Leaks"
(Page 21, "Air Testing")
"Pressure tests with air may be used to test pipe but shall not be used on tanks containing flammable or combustible liquids. With air testing there is severe danger of causing a tank rupture, or expulsion of contained liquid through normal openings; and, because of the volumes of air involved, results are very inconclusive.

Air tests of tanks containing flammable and combustible liquids should not be required by regulations or ordinances and should be discouraged in practice."
(Page 28, "Standpipe Testing")
"The following procedure will be useful where it is desired to check the tightness of any underground storage tank and its connected piping for gross leaks. It is not adequate for detecting small leaks nor for determining that a tank system is tight due to the many variables discussed in the Final Test."

The apparatus and methods of U.S. Pat. No. 3,580,055 handle the "variables discussed in the Final Test" (NFPA No. 329 — pp. 30 to 34). In spite of the availability of apparatus to perform the "Final Test" many fire and environmental officials and even petroleum maintenance supervisors resort as heretofore to air tests for underground lines, as permitted under the foregoing paragraph above on "Air Testing" and further explained in NFPA No. 239, p. 22 "Checking Underground Pipe" and particularly described in the two sections beginning on page 24, "Pipe Line Tests With Air" and "Discharge Pipe Line Testing." These state that the line to be tested with air first must be isolated from both the island pump and the tank. Isolating from the island pump usually involves disconnecting and moving the pump on the island, and capping the line. Isolating from the tank involves excavating to the tank top, usually through about 36 inches of cover, including 6 to 8 inches of concrete. Also, the line is to be drained of liquid, which usually involves leakage into the ground during the opening and capping of the line. These procedures also usually require excavating of the entire lines for inspection.

The above referred to procedures from NFPA No. 329(1972) depict standard current industry practice and official requirements. In addition to other advantages, the great labor, time and expense presently involved in the above procedures and the necessity of excavating to uncover entire lines are made unnecessary by using the apparatus and method of the present invention.

The apparatus and method of the present invention may be used to maximize the benefits of the tank system testing apparatus of U.S. Pat. No. 3,580,055, but in addition it can be used effectively by itself in many cases for improved line testing. However, there are two situations in which concurrent operation of both this apparatus and the Kent-Moore equipment will determine tightness or locate and measure leakage in a manner not possible with either apparatus alone.

Data from a great number of tests with the apparatus of U.S. Pat. No. 3,580,055 have indicated that in many cases where gasoline leakage has been found, the leak is not in the underground storage tank but is in the line that extends from the tank to the aboveground dispensing apparatus.

SUMMARY OF THE INVENTION

This invention is directed to a novel and improved apparatus for detecting a leak in the line between the underground storage tank and the dispensing apparatus (but not in the storage tank itself). Thus, the present invention is focused on the specific area which practical experience has proved to be a very likely source of gasoline leakage in the usual types of gasoline storage and pumping systems at automotive service stations. The present testing apparatus is installed and operated entirely above ground. It has a single point of quick coupling and releasable dry-break attachment to the gasoline dispensing system which is conveniently installed at the above-ground dispensing apparatus on the usual raised concrete "island" in the automotive service station. This invention uses hydraulic rather than air pressure, thus virtually eliminating error due to compressibility and expansion factors associated with air. A leak of as little as 5 ml. can be detected and measured by volume, whereas a leak of several gallons of air often goes undetected when measured by a pressure gauge.

In the preferred embodiment, the present hydrostatic testing apparatus includes a small portable pump whose outlet is to be connected to the gasoline line at the dispensing apparatus and which may be operated manually to pressurize this line to a desired test pressure. A pressure gauge monitors the pressure at the outlet side of the pump and, therefore, shows the line pressure. A calibrated burette is connected to the inlet of this pump and it supplies makeup gasoline to the pump whenever the pressure gauge reading indicates that the line pressure has dropped and the pump must be operated to restore the desired test pressure in the line. The amount of this makeup gasoline is determined by reading the calibrations on the burette before and after the pressure is restored.

Accordingly, it is a principal object of this invention to provide a novel and improved apparatus for detecting a leak in an underground fuel line.

Another object of this invention is to provide such an apparatus that is adapted for convenient and efficient use either with a gasoline dispensing system of the type in which the dispensing pump is in an underground storage tank or a system of the type in which the suction pump is in an above-ground dispensing apparatus.

Another object of this invention is to provide such an apparatus that operates on the volumetric measurement principle to provide an accurate indication of the presence of leakage in the line and the magnitude of such leakage.

Another principal object of this invention is to provide a novel and improved method of exactly locating a leak in an under-ground fuel line.

Another principal object of this invention is to eliminate the discharge of gasoline (or other liquids) into the ground during setting-up for tests as occurs with current air pressure methods.

Further objects and advantages of this invention will be apparent from the following detailed description of a presently preferred embodiment, with reference to the accompanying drawings in which:

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

PRESSURE SYSTEM — FIGS. 1–6

Figure 2:
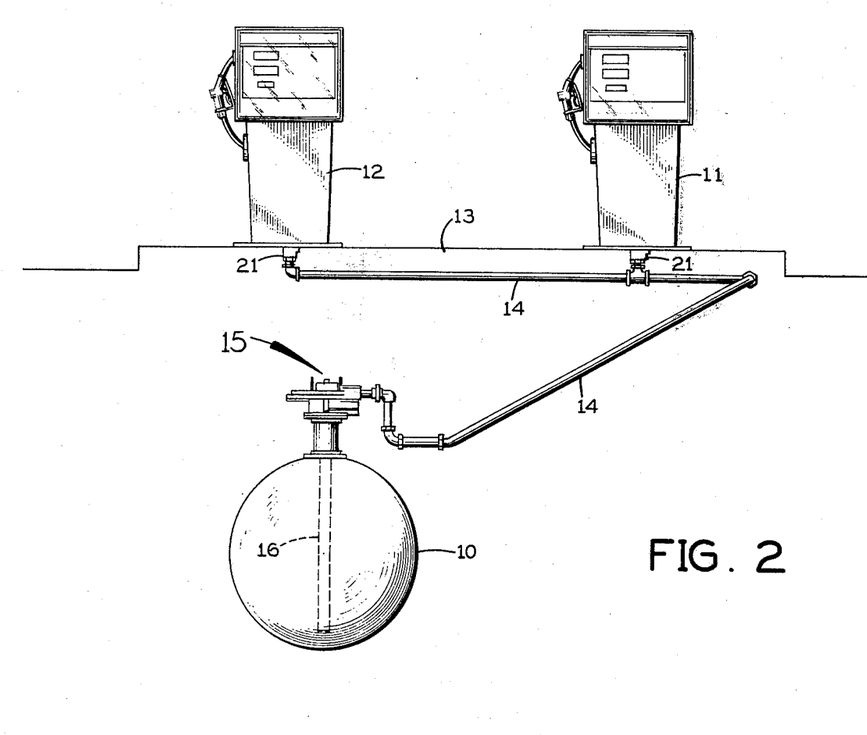
FIG. 2 is a schematic elevational view showing the pump in an underground storage tank supplying two dispensers through an underground line.

Referring first to FIG. 2, a single underground gasoline storage tank 10 is shown as supplying two dispensing apparatus 11 and 12 located on the usual concrete "island" 13 in an automotive service station. A pump 16 inside the tank pumps gasoline up through an underground line 14 to whichever dispensing apparatus 11 or 12 is demanding gasoline. A discharge head 15 on top of the pump 16 carries valves which form part of the pumping system and various sealed electrical devices and wiring associated with the pump motor.

Typically, when the pump is on and an above-ground dispensing apparatus is activated (but its nozzle is not opened) the pressure in the underground line 14 builds up to about 35 psi. (The pump has a bypass valve that opens at about 35 psi to recirculate the gasoline back to the underground storage tank when none of the dispensing apparatus nozzles are open.) When the nozzle of a dispensing apparatus is opened this pressure drops to about 30 psi, and when this nozzle is closed the pressure goes back up to 35 psi. When all of the dispensing apparatus connected to line 14 are de-activated by hanging up the hoses, the pump shuts off, the pressure in line 14 drops relatively quickly to about 20 psi.

Figures 3, 4, 5, 6:
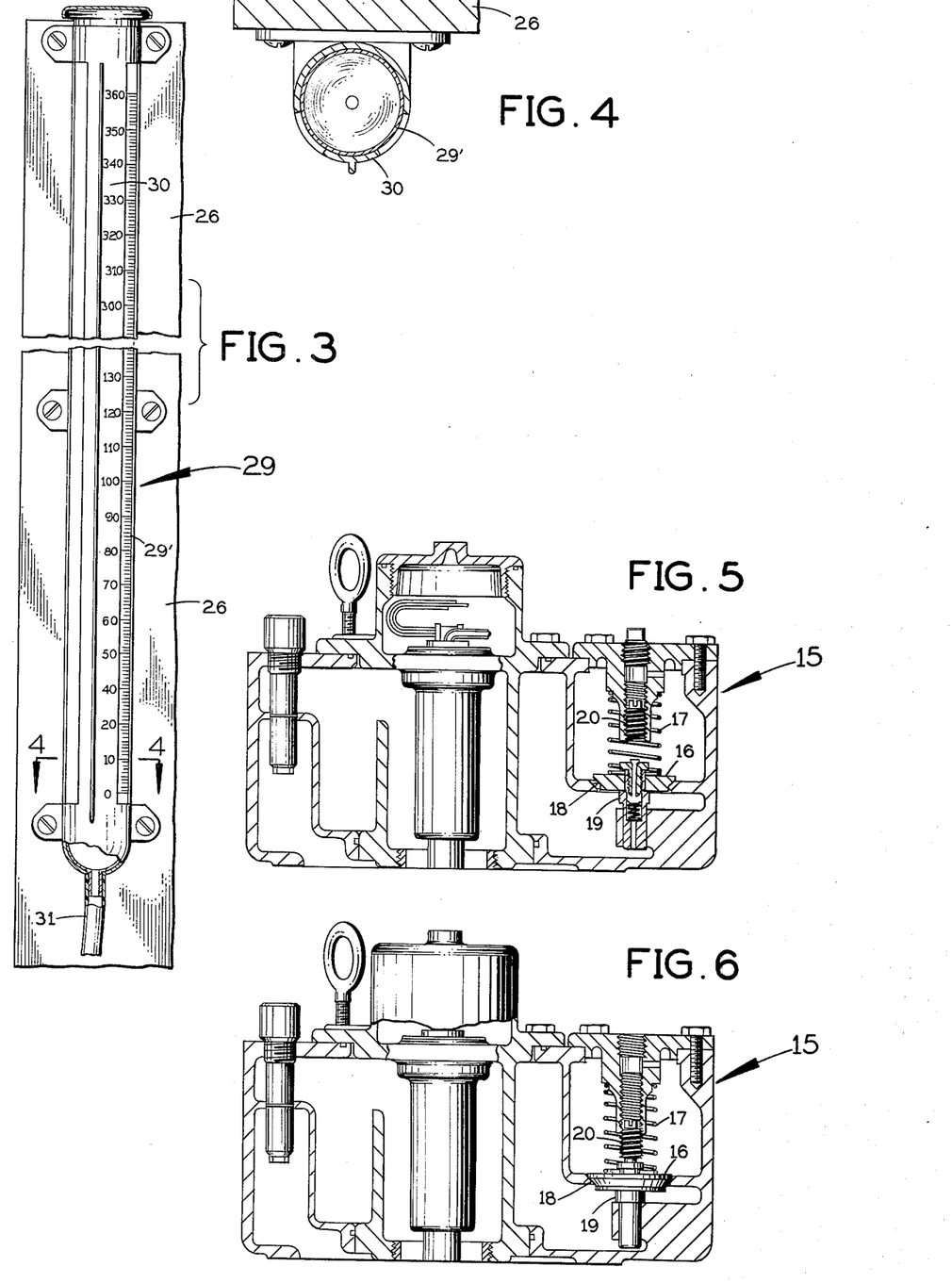
FIG. 3 is an elevational view, with parts broken away, showing the calibtrated burette in the present test apparatus.
FIG. 4 is a horizontal cross-section through this burette, taken along the line 4–4 of FIG. 3.
FIG. 5 is a vertical section through the discharge head of the pump in the top of the storage tank in FIG. 2, showing the line check valve and the built-in line relief valve in their normal condition.
FIG. 6 is a similar view, but showing both valves held closed by a screw for test purposes.

Referring now to FIGS. 5 and 6, contained in the discharge thread 15 is a check valve assembly of known design including an annular valve member 16 that is biased downward by a spring 17 into sealing engagement with a frusto-conical valve seat 18. When the pump is on, this valve opens to pass gasoline up into line 14, and when the pump is off it closes automatically to prevent reverse flow of gasoline from line 14 back down into the tank 10.

The check valve is provided with an automatic bleed-back relief valve 19 which opens to permit back flow whenever the pump is off and the gasoline pressure in line 14 exceeds about 20 psi. Typically, this occurs on a hot day when relatively cool gasoline from the underground tank becomes heated in the discharge line 14 located below the paved driveway surface. This bleed-back relief valve may be deliberately disabled, when desired in the present test method, as described hereinafter. For this purpose, a screw threaded plug 20 can be adjusted from the normal, retracted position shown in FIG. 5 down to the FIG. 6 position in which it seals the opening to the bleed-back relief valve and also forces the line check valve downward on its seat.

Figure 1:
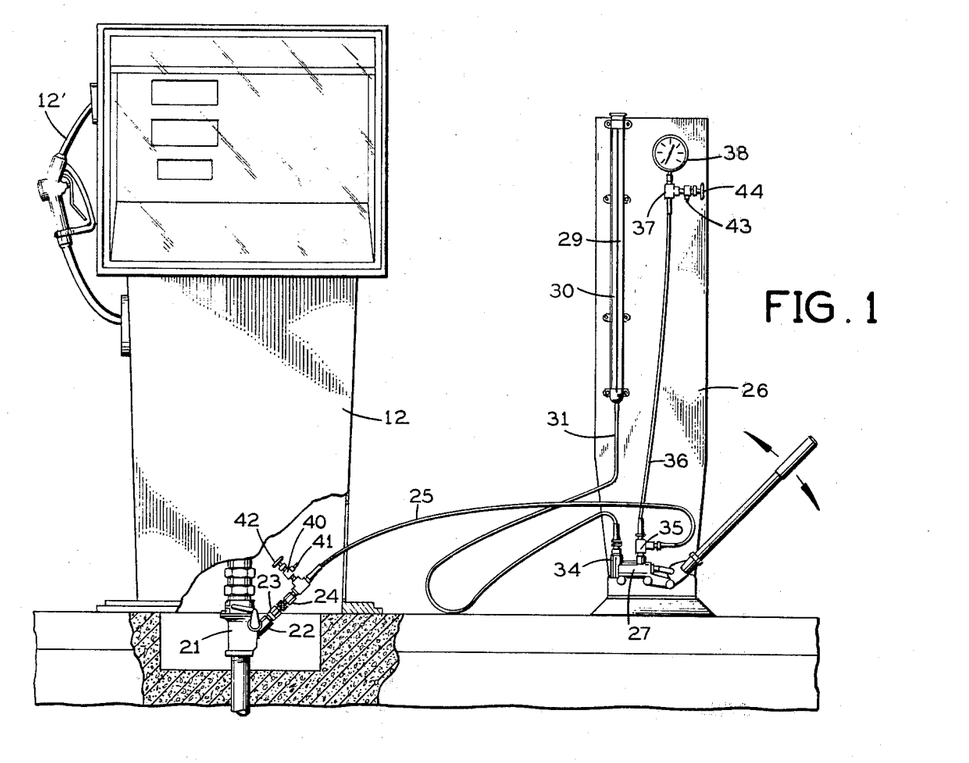
FIG. 1 is an elevational view with parts broken away for clarity, showing the present leak testing apparatus connected to the gasoline line at the base of an above-ground gasoline dispensing apparatus in a pressure system which has the dispensing pump located in the underground storage tank.

As shown in FIG. 1, the gasoline dispenser apparatus 12 is provided with the usual impact valve 21 (sometimes called a fire valve) in its base. The usual function of this valve is to cut off the flow of gasoline up into the dispensing apparatus in case the dispensing apparatus is knocked over or is exposed to a fire. The present leak testing apparatus is releasably attached to the pumping system at this valve. The valve has an upwardly inclined neck 22 which normally is closed by a screw threaded plug. This plug is removed and a threaded connector 23 is inserted in its place. This connector provides the female half of a quickdisconnect dry-break coupling of known design, having a male connector 24 on the lower end of an elongated flexible tube 25. The connector 23 closes automatically to prevent gasoline from leaking out whenever the two halves of this coupling are separated. This coupling provides the single point of attachment of the present testing apparatus to the gasoline supply system. A manually operated bleed valve 40 is provided just ahead of the quick disconnect coupling. Valve 40 has a bleed opening 41 that may be opened and closed by turning a handle 42. This handle is operated to bleed all air or vapor from the testing apparatus to insure against the presence of air with the inaccuracies caused by its compressability. The bleed valve is also operated to drain gasoline from the pumping system and to relieve pressure when disconnecting it.

In the preferred embodiment, the present testing apparatus comprises a portable stand 26 which carries a piston pump 27 of known design that is operated manually through a pivoted handle 28.

A burette 29 is mounted on the stand to extend vertically. This burette has a cylindrical tube 29' of glass or other suitable transparent material that is provided preferably with two scales, one calibrated in thousandths of a gallon and the other in millileters. These two calibrated scales are located on opposite sides of an opaque center piece 30 running vertically down the center at the front of the burette, or other separation is provided. In one practical embodiment, the burette has a 380 millileter capacity. The lower end of the burette tube 29' communicates with the inlet side of the pump 27 through a flexible hose 31 and an inlet fitting 34 on the pump.

The pump has a T-shaped fitting 35 at its outlet side, one branch of which is connected to the hose 25 leading to the quick-disconnect coupling 24, 23 at the impact valve 21. Another branch of this T-fitting is connected to the lower end of a flexible hose 36 which leads up through a bleed valve 37 to a pressure gauge 38 mounted on the stand 26. Preferably, this pressure gauge is calibrated in 1 psi increments up to a 50 or 60 psi maximum. Valve 37 has a bleed outlet 43 that is opened and closed by turning a handle 44 to eliminate air.

OPERATION — FIGS. 1–6

The first step in the present test process is to remove the usual plug from the neck 22 of an impact valve 21 in the dispensing system that is to be tested, preferably from the valve in the dispenser farthest away from the underground tank 10 in this system, and insert the female connector 23 in this valve neck.

The Kent-Moore test equipment may now be installed and testing started. At each above-ground dispensing apparatus in the system, 5 to 10 gallons of gasoline are withdrawn so as to purge air from the system and fill it throughout with gasoline.

The present test apparatus now is purged of air and filled with gasoline from the burette 29 by operating the pump 27 while the bleed outlets at valves 40 and 37 are open until gasoline appears at these bleed outlets, and then closing these bleed outlets. Now the male connector 24 is inserted in to the female connector 23 on the selected impact valve 21, and the present test apparatus is operatively connected to the dispensing system.

Following this, one of the dispensing apparatus 11 or 12 in the system is activated to turn on the pump in the underground storage tank 10, but at this time the nozzle of this dispensing apparatus is kept closed and therefore no gasoline is withdrawn from the system. The underground pump pressurizes line 14 to a pressure of about 35 psi (the by-pass valve setting), and after about 30 seconds this pump is turned off.

The test operator records the readings of the pressure gauge 38 when the pump is on and immediately when it is off. Just before the pump is turned on again, the gauge 38 is read again to give the "bleed back" pressure in line 14 (the bleed-back relief valve 19 having opened to reduce the line pressure to this value), and the burette 29 is filled with gasoline to its marked capacity.

Just before the next Kent-Moore Tank System Tightness Tester readings are taken, the pump 27 is operated manually to restore the reading of the pressure gauge 38 to the bleed back valve pressure previously determined. The burette is read before and after this operation of pump 27, and the amount of makeup gasoline pumped manually into the dispensing system is recorded.

During the first two or three test periods, no makeup gasoline may be required if the driveway is hot. Conversely, a considerable volume of makeup gasoline may be required in cold weather. Because of the expansion or contraction from temperature change these first few test readings may not be significant as far as indicating possible leakage, but after that the temperature of the gasoline in the underground line 14 near the driveway surface should have stabilized so that the following readings will be significant.

Also the first few test periods may show that the bleed back pressure is slightly different from what it was first thought to be.

After the first few test periods, if the system is leakage-free, no makeup gasoline should be required to be withdrawn from the burette in order to maintain the previously determined bleed back pressure in line 14, as read by pressure gauge 38.

If, however, it is necessary to operate the hand pump 27 in order to re-establish the bleed back pressure, then the amount of makeup gasoline withdrawn from the burette each time is recorded in order to indicate the rate of leakage. In the absence of an unusual condition, such as a rapid drop in the ambient temperature, a line leak or valve malfunction is indicated when a significant volume of makeup gasoline is required to restore the line pressure to the bleed back pressure value.

If a leak is indicated a visual inspection is made of the dispensing apparatus, the hose fittings, the fuel line under the dispensing apparatus, and the pump pit. If no sign of leakage appears then the test operator turns down the screw 20 to hold both the check valve 16 and the relief valve 19 closed. This is done to determine whether the leak is in the underground line 14 or at the underground pump head.

Now the manual pump 27 is operated again to raise the pressure in line 14 to the bleed back pressure, and the volume of makeup gasoline withdrawn from the burette 29 in order to accomplish this is recorded. Next, the pump 27 is operated to raise the pressure reading of gauge 38 to the previously recorded "pump on" pressure.

Assuming that the check valve 16 or the bleed-back relief valve 19 is not leaking, a loss of pressure now indicates strongly, but not conclusively, that there is a leak in the underground line 14.

The final determination of the leakage source is made as follows:

1. With the screw 20 kept in its valve-closed position, the Kent-Moore test process is continued on the tank 10 until consistent tank-tight readings are obtained or a consistent rate of leakage in the tank is established.
2. Leaving the Kent-Moore test equipment in place, record the burette reading and then refill the burette with gasoline to its marked capacity from a filled one gallon container.
3. Take low level critical test readings in the Kent-Moore test process.
4. Operate the hand pump 27 to withdraw gasoline from the burette 29 to increase the pressure in line 14 up to the "pump on" pressure (obtained when the underground tank pump was on) or higher.
5. As rapidly as the pressure reading of gauge 38 drops, refill the burette to its marked capacity and operate hand pump 27 until either the entire gallon from the container has been withdrawn from the burette or the next set of Kent-Moore test readings is due. Whichever occurs first, take the next Kent-Moore test readings then to determine if there has been net increase in the gasoline level in the standpipe used in the Kent-Moore test procedure.

If the standpipe level has increased by an amount equal to all of the gasoline added through the burette from the one gallon container, then there has been no leakage in the underground line 14 and the leak must be in a valve at the submerged pump.

Conversely, if the standpipe level has not increased as a result of the addition of gasoline from the burette, then there is a leak in the underground line 14 and no leak in the valves at the underground pump.

If the liquid recovered through the standpipe is part, but not all, of the quantity added through the burette from the one gallon container, the foregoing procedure should be repeated to clarify the results. If both the line and a pump valve appear to be leaking, the line leakage (which is the significant one) can be determined by subtracting from the volume pumped in the volume recovered from the standpipe.

The rate of leakage at the "pump on" pressure can now be computed from the volume of leakage and the time period involved.

The rate of leakage between dispenser sales can be calculated by rechecking the amounts pumped in earlier at the bleed-back pressure.

When two or more Kent-Moore test units are in use at one location on separate tank systems, and dry-break quick-coupler fittings have been placed in the plug opening of an impact valve of each system in advance, a single test aparatus according to the present invention can be moved from one system under test to another to check out all of the lines involved. No shut-down nor loss of Kent-Moore test accuracy is involved as there is no loss of liquid. Testing to establish tight lines and pumps would require no extra time beyond the Kent-Moore system tank tests themselves. Systems losing pressure would require a short additional time for steps 4 and 5 above. A single test apparatus according to the present invention can thus complement tests being made by two or possibly more Kent-Moore units.

Figure 7:
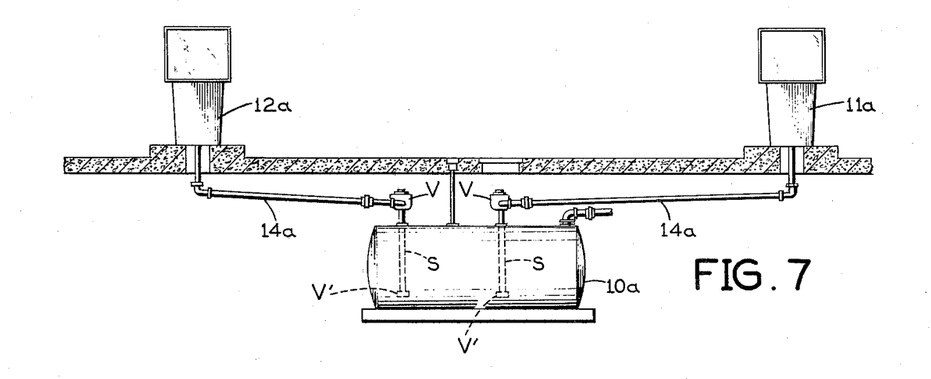
FIG. 7 is a schematic elevational view showing a gasoline dispensing system of the suction type, which has the dispensing pump located in the above-ground dispensing apparatus instead of at the underground storage tank.
Figure 8:
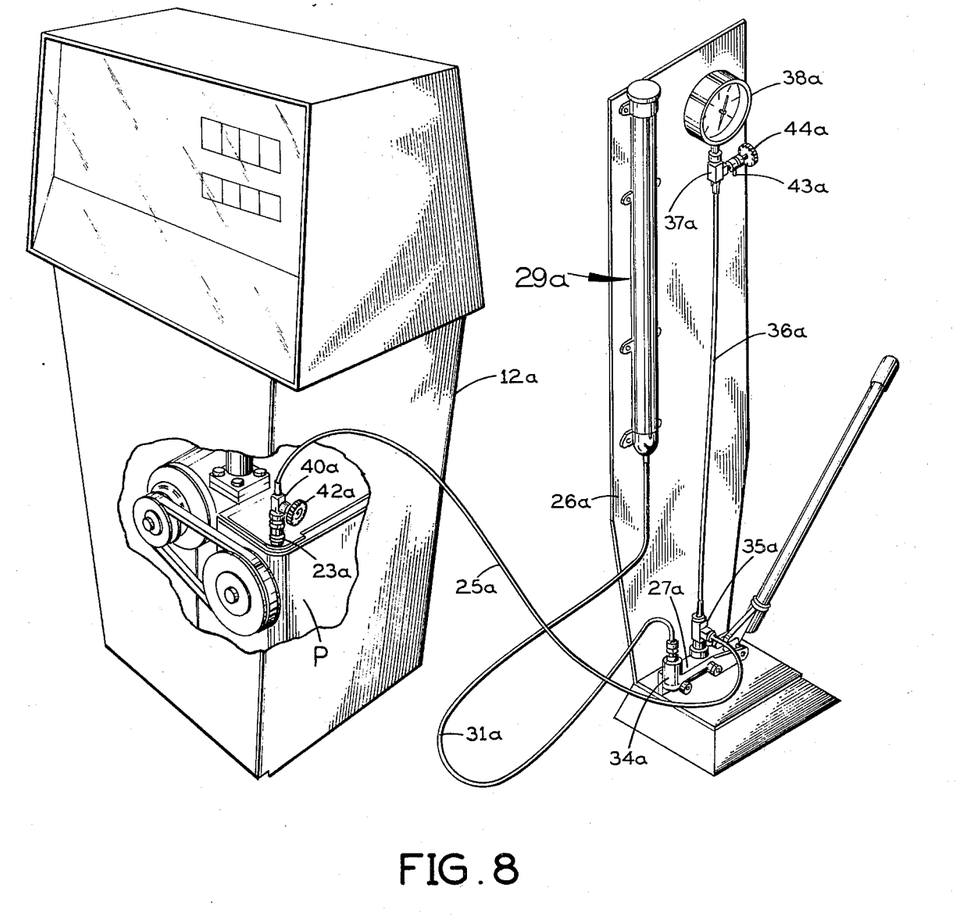
FIG. 8 is a perspective view, with parts broken away for clarity, showing the present test apparatus connected to the gasoline line at the above-ground dispensing apparatus in the FIG. 7 system.

SUCTION SYSTEM — FIGS. 7 AND 8

Referring now to FIGS. 7 and 8, the present invention may be used in testing the line in a gasoline dispensing system of the suction type, having the pump located in the aboveground dispensing apparatus rather than in the underground storage tank, as in FIGS. 1 and 2. Elements in FIGS. 7 and 8 which correspond to those in FIGS. 1 and 2 are given the same reference numerals with an "$a$" suffix added.

In FIG. 8, the Pump P for pumping gasoline from the underground storage tank 10$a$ up to the above-ground dispensing apparatus 12$a$ is located inside this dispensing apparatus, near the bottom. This pump draws gasoline from the underground tank 10$a$ up through the line 14$a$ and discharges it through the usual hose-attached nozzle in the dispensing apparatus. An angle check valve V is located just above the storage tank. Alternatively, a check valve foot V' may be located inside the tank 10$a$ near the lower end of the suction stubs. In either case, the check valve opens automatically to permit gasoline to flow up out of the tank when the pump P is on, and it closes automatically to prevent reverse flow back down into the tank when the pump is turned off and to maintain the line 14$a$ liquid-full.

In some installations there may be an additional in-line poppet check valve in the riser immediately under the pump P.

The above-ground dispensing apparatus comes with an air eliminator chamber to remove any air or entrained vapor from the gasoline discharged by pump P before the gasoline flows through the usual meter to the discharge hose and nozzle of the dispensing apparatus.

The present test apparatus is connected to the gasoline dispensing system close to the pump P. As shown in FIG. 8, this connection may be made by first disconnecting the usual vent line from the air eliminator chamber and inserting in its place a fitting 23$a$ which provides one end of a dry-break quick coupler. Normally (i.e., when the test apparatus is not connected to it) the fitting 23$a$ acts as a self-closing plug that prevents the escape of gasoline when the liquid level in the standpipe (used in the Kent-moore test procedure) is above the level of this fitting.

Alternatively, the connection of the present test apparatus into the dispensing system may be made at the location of the in-line poppet check valve in the riser immediately under the pump P (if such an in-line check valve is provided). This may be done by replacing this in-line check valve by an elbow or other pipe fitting and a reducer having a threaded opening for the quick coupler 23$a$ of the present test apparatus. Instead of this, the in-line check valve may be replaced by a similar poppet check valve of known design having a small test plug located just below the lower valve seat and removable to receive coupler 23$a$ of the present test apparatus.

Whichever way the present test apparatus is connected into the dispensing system, the test apparatus has a manually operated bleed valve 40$a$ on the end of the hose 25$a$ where such attachment is made. Whichever way is used to install the female parts of the quick coupler 23$a$, the Kent-Moore test may then be run on one or more tank systems in the usual manner.

Assuming that the Kent-Moore test procedure indicates that there is a leak somewhere in a system, either in the underground storage tank 10a or in an underground line 14a the present apparatus can be installed without leakage, and without disturbing the Kent-Moore test, by inserting coupler part 24a into 23a.

The hose 25a has a manually operated bleed valve 40a at the end adjacent to 24a. It should be operated to vent all air or vapor from the hose and test apparatus before such connection is made. It can also be used to vent any air from line 14a or the air eliminator of the pump P of FIG. 8. When connected, the present test apparatus is used in the following manner:

1. Fill the burette 29a with gasoline to its marked capacity and have additional gasoline available in a filled one gallon container to be added later to the burette, as needed.
2. Make the next set of periodic Kent-Moore test readings and compute the volume of gasoline lost from the tank system since the previous set of readings.
3. Operate the hand pump 27 to establish a predetermined relatively low pressure in the dispensing system, as read by the pressure gauge 38a, for example 10 psi. This pressure automatically closes the check valve V, or foot valve V' at the underground tank 10a; the hand pump 27a withdraws makeup gasoline from the burette 29a and pumps it into the dispensing system. If possible, the hand pump is operated long enough to pump into the dispensing system a volume of makeup gasoline from the burette that is at least equal to the volume of gasoline lost from the system between successive sets of Kent-Moore test readings. However, the pressure should not be permitted to exceed 10 psi, even if this requires stopping the hand pumping from time to time.
4. Compute and record the volume of makeup gasoline pumped from the burette into the dispensing system during the time interval between successive sets of Kent-Moore test readings while the underground line was kept at 10 psi pressure. Compare this makeup volume with the volume lost in the dispensing system between previous sets of Kent-Moore test readings.

If only a small volume (not more than 40 millileters or .01 gallon) of makeup gasoline was pumped in from the burette and the line pressure stayed at 10 psi then the check valve at the tank is tight, and the leak is in the underground tank 10a.

If, however, the entire gasoline contents of the burette were pumped into the dispensing system and the line pressure did not build up to 10 psi, there may be either:

1. a large leak in the underground line 14a, or
2. a leak in the tank 10a and a leaky check valve at this tank.

In either case, the rate of leakage as detected by the Kent-Moore test readings should be substantially zero because the gasoline lost from the dispensing system was supplied from the burette instead of from the standpipe via the underground tank, and the volume of gasoline in this tank should have remained substantially constant.

It would be most unusual to have both a leak in the line 14a and a leak in the tank 10a, so it may be assumed that only one or the other type of leak exists. To determine which, the following procedure is carried out:

a. Fill the burette half-full and have available a one gallon container filled with gasoline.
b. Make the next set of Kent-Moore test readings.
c. Operate the hand pump 27 rapidly to establish a line pressure of 25 psi, if possible. Observe and record the pressure reading of the gauge and add gasoline from the container to the burette to keep the latter half full. An observer should time and record any changes of the gasoline level in the standpipe.
d. Stop hand pumping after 1 gallon of gasoline has been withdrawn from the burette, and record the pressure minute by minute until it is time for the next set of Kent-Moore test readings, and then make these readings.

If it appears from this set of Kent-Moore test readings that the gallon of gasoline added to the dispensing system via the burette has disappeared, then the leak is in the underground line.

If these test readings show a near zero loss for the test period, the tank is not leaking.

If these test readings show a gain of one gallon (minus the previously computed average loss per test period), then the tank and its check valve are leaking and the underground line is not.

PRECISE LOCATION OF UNDERGROUND LINE LEAK

If, by following the procedures outlined hereinbefore, whether for a pressure system or a suction system, it has been determined that there is leakage somewhere in the underground line 14 or 14a, the problem remains of precisely locating this leak.

In the past, this has usually meant uncovering the entire line to locate the leak precisely. After the leak was repaired, re-testing of the line might show that additional line leaks still exist.

The apparatus of the present invention facilitates the precise location of all leaks in the underground line before uncovering the line so that any digging to get at the leak or leaks can be confined as much as practicable to the immediate vicinity of the leak or leaks.

First, with the present test apparatus disconnected from the dispensing system but with the female coupler still in place, the entire line 14 or 14a is located and marked on the driveway the entire line 14 or 14a is located and marked on the driveway surface. Preferably, such location is done with a pipe locater of known design, including an electrical signal transmitter, which is coupled to the line either conductively or inductively, and a hand-carried receiver that picks up the transmitted signal when it is directly over the line carrying the signal.

After the line location has been marked on the driveway surface, the present test apparatus is filled with gasoline and air is vented from it in the manner already described. Then it is connected into the dispensing system as already described, either at the impact valve 21 (FIGS. 1 and 2) or at the fitting F (FIG. 8).

The hand pump is operated to pressurize the underground line to 35 psi in the case of a pressure system (FIGS. 1 and 2) or 25 psi in the case of a suction system (FIGS. 7 and 8). If a pressure system is being tested, the check valve and bleed-back valve in the underground dispensing pump head are locked closed, as already described.

With the underground line now pressurized, a portable ultrasonic detection device of known design (such as a geophone) is used to survey the driveway-marked length of the line for the presence of sonic vibrations given off by the escape of pressurized liquid from the line. Any such leaks detected by the geophone are marked on the driveway at the precise location where the geophone signal reception is the strongest. With the locations of the leaks thus pinpointed, the driveway need be dug up only as necessary to get at the precisely located leaks.

I claim:

1. Apparatus for detecting a leak in a gasoline line extending from an above-ground gasoline dispensing apparatus down to an underground gasoline storage tank provided with a check valve for preventing return flow of gasoline back down into the tank, said apparatus comprising:
   a pump selectively operable to pump gasoline into said line;
   means for detachably connecting the outlet of said pump to said line at said dispensing apparatus for pumping gasoline into said line;
   pressure sensing means operatively connected to said line to sense the gasoline pressure established in said line by said pump;
   and volumetric measuring means operatively connected to said pump to supply makeup gasoline to said pump and thereby sense any loss of gasoline after pressurization of said line by said pump.

2. Apparatus according to claim 1, wherein said volumetric measuring means is a burette connected to the inlet of said pump and calibrated to indicate the quantity of makeup gasoline drawn from the burette by said pump when the latter is operated to pump gasoline into said line.

3. Apparatus according to claim 1, wherein said means for connecting the pump to said gasoline line comprises a hose extending from the outlet of said pump, and connector means on the opposite end of said hose for releasable attachment to said gasoline line at said dispensing apparatus.

4. Apparatus according to claim 3, and further comprising a manual bleed valve on said opposite end of the hose ahead of said connector means to eliminate air and for drainage and pressure relief purpose.

5. Apparatus according to claim 3, wherein:
   said pump is manually operable;
   said pressure sensing means is a pressure gauge connected to the outlet of said pump;
   and said volumetric measuring means is a burette having its outlet connected to the inlet of said pump and calibrated to indicate the volume of gasoline drawn from the burette by said pump when the latter is operated to pump gasoline into said gasoline line.

6. Apparatus according to claim 5, and further comprising a manual bleed valve on said opposite end of the hose ahead of said connector means.

7. Apparatus according to claim 5, and further comprising a manual bleed valve connected to the outlet of said pump just ahead of said pressure gauge to eliminate air and for drainage and pressure relief purposes.

8. Apparatus according to claim 5, and further comprising a portable stand carrying said pump, pressure gauge and burette for handling as a unit.

9. Apparatus according to claim 8, and further comprising a manual bleed valve on said opposite end of the hose ahead of said connector means.

10. Apparatus according to claim 9, and further comprising a manual bleed valve connected to the outlet of said pump just ahead of said pressure gauge to eliminate air and for drainage and pressure relief purposes.

11. A method of detecting a leak in a gasoline line that extends from an above-ground gasoline dispensing apparatus down to an underground storage tank provided with a check valve for preventing return flow of gasoline down into the tank, said method comprising the steps of:
   connecting the outlet of a person-operated pump to said gasoline line at said dispensing apparatus, and operating said pump to pump gasoline into said line;
   monitoring the pressure in said line;
   supplying makeup gasoline to the inlet of said pump and operating said pump to pump makeup gasoline into said line whenever the pressure therein is below a predetermined level;
   and measuring the volume of the makeup gasoline drawn by said pump.

12. A method according to claim 11, wherein a dispensing pump is located in said tank, and said check valve has a bleedback relief valve that normally is operable to open automatically so as to return gasoline from said line back into said storage tank at a predetermined bleedback pressure in said line when the dispensing apparatus is de-activated, and wherein:
   while said bleedback relief valve is free to open automatically, the person-operated pump is operated to establish and maintain said bleedback pressure in said line, and the volume of makeup gasoline drawn by said person-operated operated pump is measured.

13. A method according to claim 12, and further comprising the later steps of:
   locking said bleedback relief valve closed;
   thereafter, operating said person-operated pump to establish and maintain said bleedback pressure in said line, and measuring the volume of makeup gasoline drawn by said person-operated pump;
   thereafter, operating said person-operated pump to establish and maintain a higher pressure in said line, and measuring the volume of makeup gasoline drawn by said person-operated pump.

14. A method according to claim 11, wherein the outlet of said person-operated pump is connected by a dry-break quick-coupler to an impact valve at the base of the above-ground dispensing apparatus.

15. A method according to claim 11, wherein the above-ground dispensing apparatus has a dispensing pump therein for drawing gasoline from said underground tank and provided with an air eliminator, and the outlet of said person-operated pump is connected by a dry-break quick-coupler to said line at the location of said air eliminator for the dispensing pump.

16. A method according to claim 11, wherein the above-ground dispensing apparatus has a dispensing pump therein for drawing gasoline from said underground tank and an in-line poppet check valve just below said dispensing pump, and the outlet of said person-operated pump is connected to said line at the bottom of said in-line check valve by the use of a dry-break quick-coupler.

17. A method according to claim 11, wherein the above-ground dispensing apparatus has a suction dispensing pump therein for drawing gasoline from said underground tank under partial vacuum, and wherein:

the person-operated pump is operated to provide above-atmospheric pressure in said line, and the volume of makeup gasoline drawn by said person-operated pump to maintain said pressure is measured.

18. A method according to claim 17, and further comprising the later steps of:

operating the person-operated pump to establish a higher pressure in said line and pump a predetermined volume of gasoline into said line;

and monitoring the pressure in said line after said predetermined volume of gasoline has been pumped in.

19. A method of detecting and locating a leak in a line not accessible for observation having blocked portions comprising the steps of:

connecting the outlet of a pump to said line between said blocked portions;

operating the pump to supply liquid into the line;

monitoring the pressure in said line;

supplying makeup liquid to the inlet of said pump and operating said pump to supply makeup liquid into said line whenever the pressure therein is below a predetermined level so as to restore the pressure to said level;

measuring the volume of makeup liquid drawn by said pump to detect a leak;

electrically locating the line and marking the location thereof;

operating the pump to pressurize the line with liquid, and ultrasonically sounding said line to locate said leak and marking the location thereof.

20. Apparatus for detecting a leak in a gasoline line extending from an above-ground gasoline dispensing apparatus down to an underground gasoline storage tank provided with a check valve for preventing return flow of gasoline back down into the tank, said apparatus comprising:

a pump selectively operable to pump gasoline into said line:

means for detachably connecting the outlet of said pump to said line at said dispensing apparatus for pumping gasoline into said line;

a pressure gauge connected to the outlet of said pump ahead of the latter's connection to the gasoline line for sensing the gasoline pressure established in said line by said pump;

and a burette connected to the inlet of said pump and calibrated to indicate the quantity of gasoline drawn from the burette by said pump when the latter is operated to pump gasoline into said line, whereby to sense any loss of gasoline after pressurization of said line by said pump.

21. Apparatus according to claim 20, and further comprising a manual bleed valve connected to the outlet of said pump just ahead of said pressure gauge.

22. Apparatus according to claim 20, and further comprising a manual bleed valve connected to the outlet of said pump just ahead of said means for detachably connecting the pump outlet to said line at said dispensing apparatus.

23. Apparatus according to claim 3, and further comprising a manual bleed valve connected to said hose just ahead of said connector means.

* * * * *